United States Patent [19]

Martinelli

[11] 4,321,956
[45] Mar. 30, 1982

[54] BELT ATTACHMENT FOR TIRE CHAINS

[76] Inventor: René J. Martinelli, 1905 Hill House Dr., Clackcamas, Oreg. 97015

[21] Appl. No.: 122,195

[22] Filed: Feb. 19, 1980

Related U.S. Application Data

[63] Continuation-in-part of Ser. No. 3,273, Jan. 15, 1979, Pat. No. 4,280,545.

[51] Int. Cl.³ .............................................. B60C 27/00
[52] U.S. Cl. .................................. 152/222; 24/68 TT; 24/71 TT; 24/129 W; 24/363; 152/221; 152/242; 403/407
[58] Field of Search ............... 152/222, 221, 219, 233, 152/242, 239, 170, 172; 403/407, 284; 104/115, 201, 200; 248/505; 24/68 CT, 68 TT, 68 E, 69 TT, 70 TT, 71 TT, 73 AC, 73 CE, 73 BH, 73 SA, 73 BS, 73 A, 73 MC, 71 CT, 115 A, 115 G, 122.3, 129 B, 129 W, 201 HE, 248 R, 115 M, 230 A, 230 TC, 230 AT, 363

[56] References Cited

U.S. PATENT DOCUMENTS

| 870,657 | 11/1907 | Woodworth | 152/222 |
| 1,185,084 | 5/1916 | Gahan | 152/221 |
| 3,796,461 | 3/1974 | Cucheran | 24/201 HE |
| 4,010,501 | 3/1977 | Cooke | 24/201 HE |
| 4,155,389 | 5/1979 | Dwinell | 152/221 |
| 4,261,404 | 4/1981 | Lew | 152/221 |
| 4,263,954 | 4/1981 | Dwinell | 152/222 |

Primary Examiner—John E. Kittle
Assistant Examiner—Thomas Bokan

[57] ABSTRACT

A wire rope traction device or cable tire chain includes lateral cables and a plurality of cross cables for extending between the lateral cables across the sole of a tire. Flat metal members secured to the lateral cables and ends of the cross cables form low profile articulated connections therebetween substantially adjacent the sole of the tire and radially outwardly from the tire sidewall flexing point for enabling a tighter grip on the tire by the tire chain. A belt attachment is employed in securing the traction device to a tire and is provided with a hook which is readily released for removal of the traction device.

2 Claims, 12 Drawing Figures

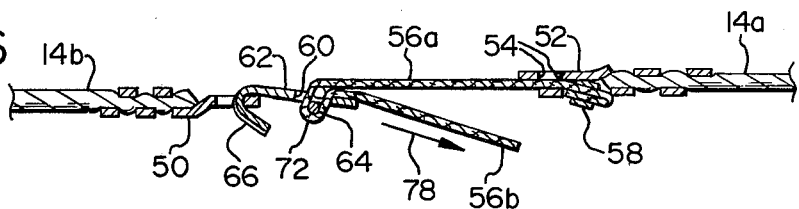
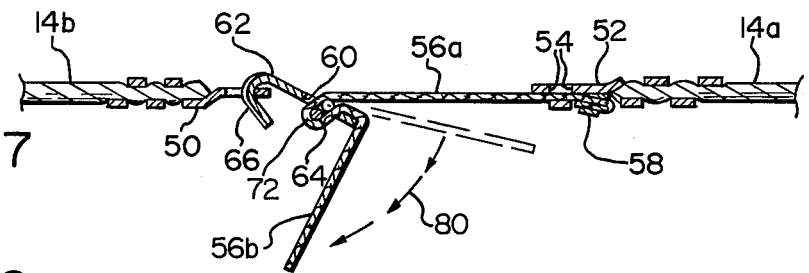
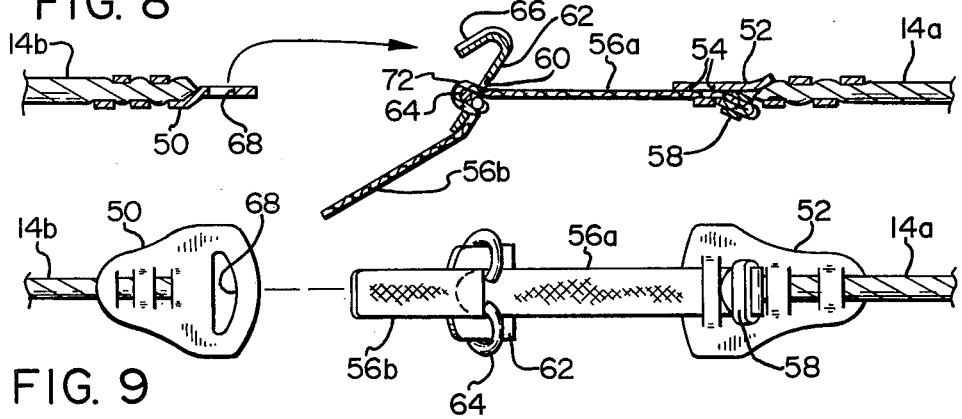
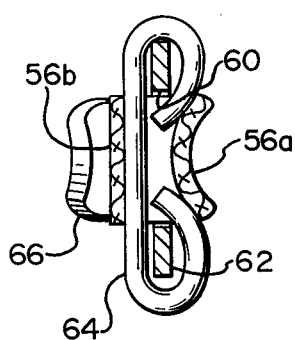
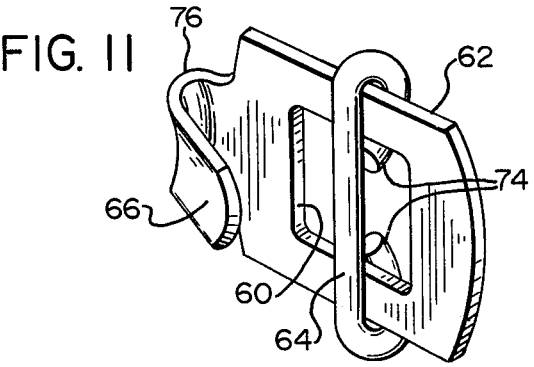
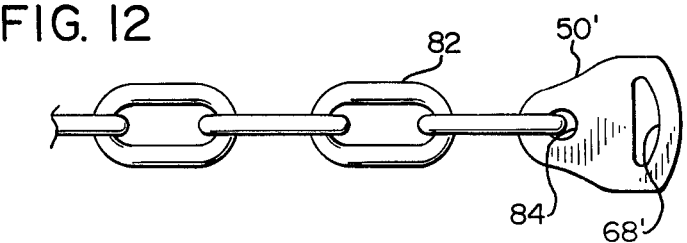

BELT ATTACHMENT FOR TIRE CHAINS

CROSS REFERENCE TO RELATED APPLICATION

This application is a continuation-in-part of my application Ser. No. 3,273, filed Jan. 15, 1979 entitled "Wire Rope Traction Device for Tires" now U.S. Pat. No. 4,280,545.

BACKGROUND OF THE INVENTION

The present invention relates to traction devices for tires and particularly to an improved attachment means which is quickly releasable for removing a traction device.

Recent model automobiles are characterized by reduced clearance in fender wells making the use of conventional tire chains difficult or impossible. Furthermore, tires are not constant in shape but flex to a considerable extent, especially when bearing the weight of a vehicle. Lightweight cable chains are desirable but even these are apt to rub on the sides of the fender wells resulting in damage to the vehicle and the tire particularly because of chain looseness. Thus, it is of importance to secure the chains as tightly as possible to a tire for avoiding slack in both the radial and lateral directions. Since proper tightness is dependent upon proper installation, it is also useful to enhance the ease with which chains can be tightened and subsequently removed.

Conventional tire chain fastening means are somewhat cumbersome and frequently contribute to the bulk and looseness of tire chains rather than solving these problems. Chains are usually attached to a tire only with considerable difficulty and are disengaged in a manner likely to be awkward and unpleasant because of moisture and road grime accumulated on the chains and tires.

SUMMARY OF THE INVENTION

In accordance with a preferred embodiment of the present invention, attachment means including a belt and a buckle are employed for tightly drawing tire chain lateral members toward one another, said buckle having a releasable connection so that when an end of said belt is drawn outwardly, the buckle is automatically and quickly released. In a particular embodiment, the buckle includes an angular hook at one end engaging the aperture of a lug attached to a tire chain lateral member. The belt is looped through the buckle from the rear whereby drawing outwardly on the end of the belt rotates the hook out of the aperture and quickly releases the connection.

It is accordingly an object of the present invention to provide an improved fastening means for a tire chain for easily and quickly tightening said tire chain.

It is another object of the present invention to provide an improved fastening means for a tire chain which is rapidly releasable for removing the tire chain from a tire.

It is another object of the present invention to provide an improved fastening means for a tire chain which is particularly adaptable to fastening of lightweight cable chains.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

BRIEF DESCRIPTION OF THE DRAWINGS

FIG. 6 is a cross-sectional view, similar to the view of FIG. 2, illustrating tightening of the attachment means according to the present invention;

FIG. 7 is a further cross-sectional view illustrating a step in the release of said attachment means;

FIG. 8 is a yet further cross-sectional view illustrating said attachment means as released;

FIG. 9 is an elevational view of said attachment means in released condition;

FIG. 10 is a cross-sectional view taken at 10—10 in FIG. 1;

FIG. 11 is a perspective view of a buckle member forming a part of the attachment means according to the present invention; and FIG. 12 is an elevational view, partially broken away, of a portion of an attachment means according to an alternative embodiment of the present invention.

DETAILED DESCRIPTION

Figure 1:
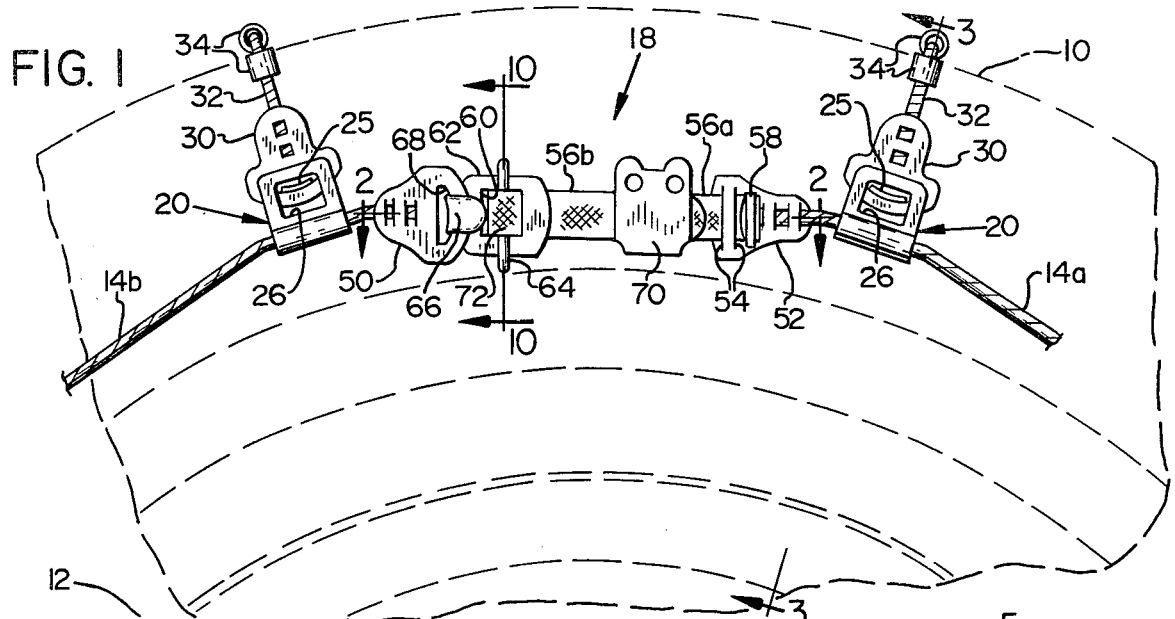
FIG. 1 is an elevational view, partially broken away, of a traction device provided with attachment means according to the present invention and mounted upon a tire indicated in dashed lines.
Figure 2:
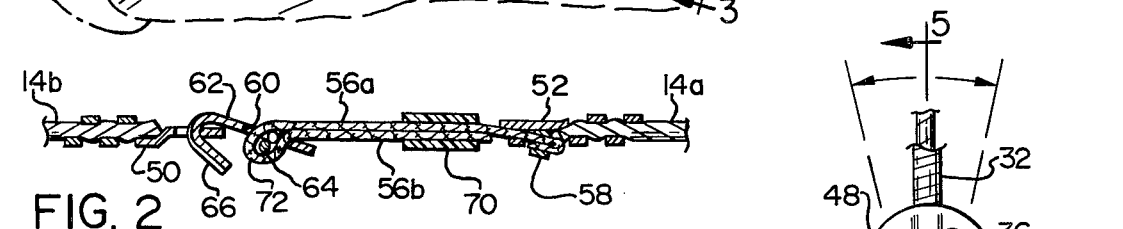
FIG. 2 is a cross-sectional view taken at 2—2 in FIG. 1 further illustrating such attachment means.
Figure 3:
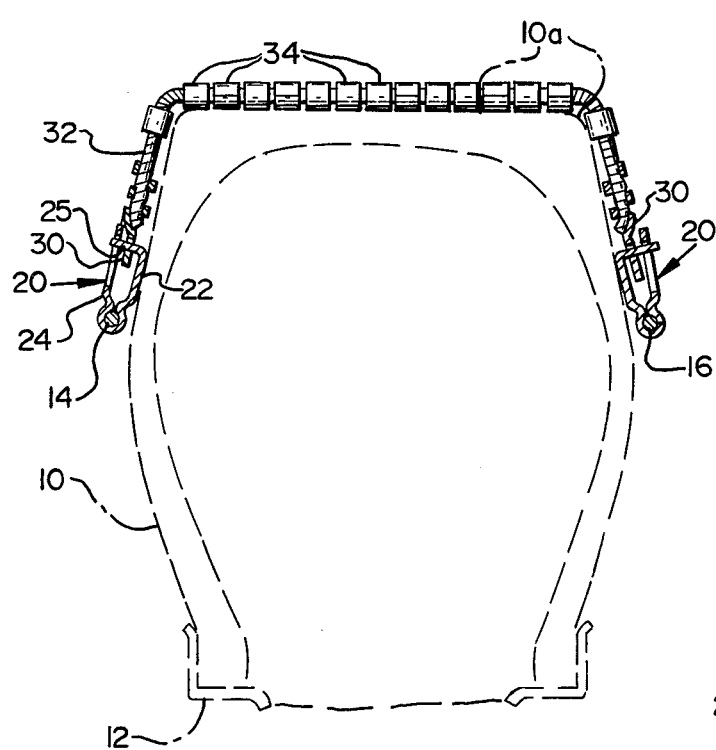
FIG. 3 is a cross-sectional view taken at 3—3 in FIG. 1.
Figure 5:
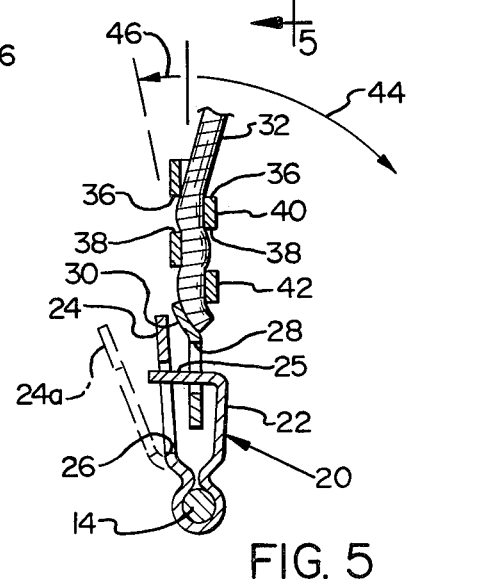
FIG. 5 is a cross-sectional view of the FIG. 4 articulated connection taken at 5—5 in FIG. 4.

Referring to the drawings, a wire rope traction device or tire chain is illustrated as secured upon a tire 10, indicated by dashed lines, mounted upon a wheel 12 the rim of which is also illustrated in dashed lines in FIGS. 1 and 3. The traction device includes lateral wire ropes or cables 16 and 14 (having ends 14a and 14b) which extend circumferentially about the sidewalls of the tire, being joined at their respective ends by means of a belt attachment according to the present invention as illustrated in FIGS. 1 and 2. Each of the lateral cables is provided at spaced points with flat metal clamping straps 20, each of which is crimped around the lateral cable to form a first side 22 and a second facing side 24 in facing parallel relation to the sidewall of the tire 10. The first side of the cable clamping strap is bent over to form a tongue 25 extending substantially perpendicularly away from the sidewall of the tire, while side 24 is apertured at 26 and receives the tongue in securing relation such that the tongue is not easily distorted by tension from the illustrated configuration. Moreover, each tongue is also received through an aperture 28 in a flat metal, spade-shaped, cross link anchor 30 secured to the end of a cross wire rope or cable 32, and the closed loop configuration of the cable clamping strap 20 prevents disengagement between members 20 and 30. In forming the articulated connection, the tongue 25 is first inserted through the aperture 28 as illustrated in FIG. 5, at which time side 24 is in the position illustrated in dashed lines at 24a. Then, side 24 is closed toward side 22 while the cable 14 is crimped between the sides. The tongue 25 will then extend slightly through the upper portion of aperture 26 as shown.

Figure 4:
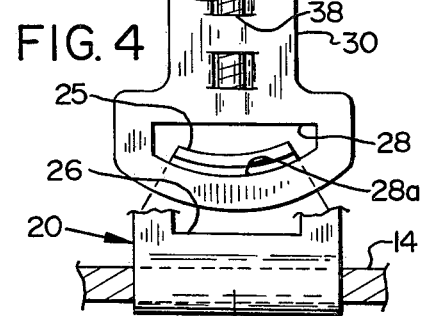
FIG. 4 is a broken away view of a pair of articulated connecting members positioned between lateral cables and cross cables of the traction device.

The upper portion of the cross link anchor is doubly slit as at 36 and 38 in FIG. 4, and the portion 40 between the slits is depressed so as to receive the cable 32 for crimping the cable against the back of the anchor 30. This configuration is suitably repeated as illustrated in FIGS. 4 and 5, and it is seen the crimping of sections 40 and 42 against the cable 32 produces an S-shaped cable configuration. The cable tends to be bent in the direction away from the back of the cross link anchor, i.e. toward the tire. However, the flexibility of the cable is retained by this crimping arrangement.

Cross cables 32 extend over the sole 10a of the tire 10, i.e. where the tire tread is located, between aligned cable clamping straps 20, a cross link anchor 30 being secured at each end of each cross cable for engaging a corresponding clamping strap in the manner hereinbefore described. Cable 32 is suitably multistrand steel cable covered by a helically wound flat steel strip, the turns of which are spaced slightly so the cable remains flexible. Around the exterior of the cable 32 are received a plurality of cylindrical steel sleeves 34 adapted for engaging the road surface and which are able to slide or rotate with respect to the cable 32.

The tongue 25 of each clamping strap 20 is received through an aperture 28 in a cross link anchor 30, as described above, in non-binding relation so as to provide an articulated or hinging connection between members 20 and 30. Although both members 20 and 30 are formed of flat metal and are disposed substantially flat against the corresponding tire sidewall, sides 22 and 24 of clamping strap 20 are spaced far enough apart so as to provide for limited sliding movement of anchor 30 along tongue 25 in a direction perpendicular to the tire sidewall to enable a considerable hinging movement as illustrated by arrows 44 and 46 in FIG. 5. The principal hinging movement for anchor 30 is in the direction of arrow 44, i.e. toward the tire sidewall for accommodating the changing contour of the tire. Thus, as the sidewall flexes, for example as it contacts the road and receives the pressure of the vehicle, the joint between members 20 and 30 formed between tongue 25 and aperture 28 will also flex while retaining close hugging contact with the tire.

The aperture 28 in anchor 30 is elongate in a direction circumferential of the tire and likewise the cross section of tongue 25 is elongate in the same direction to provide a strong connection. However, tongue 25 is shorter in such direction than aperture 28 to allow for relative sideways movement between the members 20 and 30. Both the lower edge 28a of aperture 28 and the cross section of tongue 25 engaged thereby are curvilinear with respect to a center of curvature, e.g. at 48, disposed upwardly along cross cable 32. Thus, the curved engaging surfaces permit sliding movement therebetween and possible angular disposition of cross cable 32 relative to lateral cable 14 in the plane of the sidewall as may occur in mounting the chain or in movement of the chain during use, without requiring bending of the cross cable as could cause cable failure. Also, this configuration prevents binding as might otherwise prevent flexure of the articulated joint with flexure of the sidewall of the tire. Therefore, a stable cable engaging joint which is fully articulated in two directions is provided at the tire sidewall adjacent the sole of the tire, said joint being formed of substantially flat members which require a minimum of clearance adjacent the tire sidewall and which are structurally strong and wear resistant.

According to an advantageous construction, the cross cables 32 position members 30 and 20 as well as the lateral cables 14 and 16 secured thereby in relatively close spaced relation to the sole 10a of the tire. The lateral cables 14 and 16 are placed about two inches from the tread, i.e. just outside the sidewall flexing point or bulge of radial tires. The articulated connections, i.e. at each joint provided between a tongue 25 and a slot 28, are located substantially closer to the sole of the tire than to the rim of the wheel upon which the tire is mounted, and these articulated connections adjacent the sole of the tire provide hinging action with flexure of the tire at this point as well as the necesssary durability as hereinbefore mentioned. The configuration results in a tighter gripping action between the overall tire chain and the tire, since being located substantially outside the major flexing point of the tire and forming a tight "cap" around the tire periphery. The cable configuration does not have to accommodate as great a change in tire shape as prior chain configurations, and consequently is not as loose and does not execute as much sideways movement with bulge of the tire. Radial throw-out of the cross cables or cross links is minimized, e.g. at the top of the tire when the bottom of the tire is being compressed due to weight of the vehicle. The present cross cables are shorter, are held closer, and are not slackened as a result of accommodating radial tire bulge. Tire chain wear and wear of the tire and vehicle fender well are lessened as the chain more tightly and consistently adheres to the tire. This "raising" of the lateral chains 14 and 16 toward the sole of the tire and the consequent tightening of the tire chain with respect to the tire is made possible by the sturdy and flat articulated joint formed by members 20 and 30, which can be positioned substantially adjacent the sole or tread of the tire and which can withstand severe conditions without failure. Not only does the flexible joint provided by members 20 and 30 enable a more peripherally located cable tire chain, but also the members themselves are substantially flat or low profile, being closely spaced against the tire sidewall so as to be well accommodated in the clearance provided between the tire and the fender wells of modern automobiles. As a further advantage, the overall weight of the tire chain is reduced.

As hereinbefore mentioned, each of the lateral cables 14 and 16 is provided with a belt attachment 18 according to the present invention for securing the respective cable ends thereof together for mounting the traction device upon a vehicle tire. The belt attachment according to the present invention also enables quick release of the lateral cables for rapid removal of the traction device. A first end 14a of a lateral cable is secured by crimping the same through slots in a lug 52 which is spade-shaped and somewhat similar in construction to the cross link anchors 30. The lug is formed of flat metal and is punched to provide lateral slots 54 at the end thereof remote from the connection to cable end 14a. The portion of the lug between the slots is relatively upraised for receiving one end 56a of a webbed belt which is doubled and held by means of an enclosing metal fitting 58. Away from lug 52, the belt is doubled to provide a loop 72 which extends through a rectangular aperture 60 in a flat metal buckle 62. The belt is looped around a slide bar or rod 64 employed for holding the loop in releasably secured relation to the buckle.

The rod 64 extends across the buckle 62, and across the aperture 60 thereof, with the ends 74 of the rod being bent around the side edges of the buckle and extending into aperture 60 from the opposite side, as illustrated in FIG. 11, for retaining the rod on the buckle. The rod is slidable along the buckle, and with the belt drawn up tightly, the rod wedges the belt loop 72 against the edge of aperture 60 closest to lug 52. The belt loop extends through the aperture 60 from the rearward side thereof next to the tire sidewall, and when the belt is drawn up tightly the layers of belt behind the buckle tend to dispose the buckle in an angular relation to the tire sidewall, i.e. with the edge of the buckle closest to lug 52 being slightly upraised from the sidewall of the tire. After passing through the aperture of the buckle and being drawn up tightly, end 56b of the belt is normally secured against flapping by means of a plastic clasp 70 which snaps together and secures belt end 56b to belt end 56a immediately therebehind.

The end of buckle 62 farthest from lug 52 is provided with a curved hook 66 which extends outwardly away from the tire sidewall and back over the forward face of buckle 62, making an acute angle with the face of the buckle on the order of about thirty degrees. The hook including the terminal end, as well as the neck 76 where it joins the buckle, is suitably curved or dished in lateral cross section as particularly illustrated in FIGS. 10 and 11. The hook 66 engages an aperture 68 of a flat metal lug 50 provided with slots through which lateral cable end 14b is secured by crimping, lug 50 being spade-shaped and similar in outline to the aforementioned lug 52. The aperture 68 in lug 50 is wider in the lateral direction than hook 66, and is curved at its outer edge to match the lateral curve in hook 66, such that slidable movement between hook 66 and the forward edge of aperture 68 is facilitated. Since both edges are thus curved and aperture 68 is wider than hook 66, the two elements can be disposed at an angle to one another if necessary.

Since in installing and releasing the tire chain or traction device the same procedure is followed on each side of the tire, the procedure will be described for only one side. Of course the plastic clasp 70 will be disengaged and the belt end 56b will be initially loosened with respect to buckle 62 so as to provide plenty of slack. With the tire chain or traction device positioned around the sole of the tire substantially as illustrated, hook 66 is inserted through aperture 68 in lug 50 from its rear side adjacent the tire sidewall. The belt end 56b is then drawn up tightly to the right (in the direction indicated by arrow 78 in FIG. 6) as rod 64 wedges the belt loop against the right-hand side of aperture 60. The belt end 56b is then positioned along the inside belt end 56a and the two are joined by clasp 70. It will be observed the installation and tightening of the traction device or tire chain is quite simple and quickly accomplished, while at the same time providing a degree of tightness suitable for taking advantage of the tight fitting traction device as hereinbefore illustrated and described.

Although the tire chain or traction device is tightly secured according to the belt attachment of the present invention, it is nevertheless quickly releasable as illustrated in FIGS. 7 through 9. The clasp 70 holding the belt end 56b against belt end 56a is first removed, and then belt end 56b is drawn outwardly as indicated by arrows 80 in FIG. 7. The buckle 62 is normally disposed at an angle to the tire sidewall since the belt ends proceed into the buckle aperture from the rear side whereby the belt ends and rod 64 hold up the right-hand side of the buckle, and moreover hook 66 is angularly related to the to the flat surface of the buckle 62 as hereinbefore described. The net result is that when drawn up tightly, the hook 66 makes an angle of about forty-five degrees with the tire sidewall and with the flat surface of lug 50. Then, pulling belt end 56b outwardly easily rotates buckle 62 in a clockwise direction (as viewed in FIGS. 7 and 8) by more than another forty-five degrees, allowing hook 66 to slip quickly out of aperture 68 as illustrated in FIGS. 8 and 9, the hook and aperture thereby providing a quickly releasable connection.

Although the belt attachment according to the present invention has been described in connection with the traction device of my prior application as also described herein, and although the belt attachment has particular advantage in combination with such traction device in completing a tight fitting road engaging means for preventing vehicle and tire damage, nevertheless the belt attachment according to the present invention is also suitably employed with a more conventional chain-link tire chain. In FIG. 12, a lateral chain member 82, adapted for positioning adjacent a tire sidewall, is linked through an aperture 84 of a spade-shaped lug 50' having a forward hook-engaging aperture 68'. The aperture 68' is adapted for engaging the hook of a belt receiving buckle as previously described. It will be appreciated that a remaining lug such as lug 52 in the previous embodiment will be similarly apertured to receive the opposite end of a chain-link lateral member, while also providing the hereinbefore described connection to a belt end 56a.

While I have shown and described preferred embodiments of my invention, it will be apparent to those skilled in the art that many other changes and modifications may be made without departing from my invention in its broader aspects. I therefore intend the appended claims to cover all such changes and modifications as fall within the true spirit and scope of my invention.

I claim:

1. In a tire chain, a tire chain lateral member adapted to extend adjacent a lateral side of a vehicle tire, a first lug secured to a first end of said lateral member, a second lug secured to a second end of said lateral member, said second lug having a slot, a belt having a first end secured to said first lug, and a buckle for location along said lateral side of said vehicle tire, said buckle having an aperture therethrough and a hook on one end thereof turned back at an acute angle to a laterally outwardly facing side of said buckle, wherein said hook is adapted for reception through the slot in said second lug when said tire chain is secured to said tire, a loop of said belt between first and second ends thereof extending through the aperture of said buckle from the inwardly facing side of said buckle adjacent the lateral side of said tire, said buckle including a slidable member passing through said loop for holding said loop in releasably secured relation to said buckle when the second end of said belt is drawn up, wherein the second end of said belt extends from said buckle toward said first end when said tire chain is secured to said tire while being movable laterally outwardly for rotating said buckle and rapidly releasing said hook from said second lug to release said tire chain from said tire.

2. In a cable tire chain, a cable tire chain lateral cable adapted to extend adjacent a lateral side of a vehicle tire, a belt having a first end and a second end, a first spade-shaped lug secured to a first end of said lateral cable and receiving the first end of said belt in securing relation, a second spade-shaped lug secured to a second end of said lateral cable, said second lug having a lateral slot, and a flat buckle having an aperture therethrough for receiving said belt, with said belt and buckle lying along said lateral side of said vehicle tire, said buckle having a hook on an end thereof farthest from said belt and said first lug wherein said hook curves outwardly away from the lateral side of said tire and over said buckle making an acute angle with said buckle for engaging the slot in said second lug, said buckle having a slidable member movable along said buckle over the aperture thereof, said belt having a first run extending from said first lug, along the lateral side of said tire, through said aperture in said buckle from the side thereof adjacent the tire, around said slidable member, and back through said aperture to form a second run of said belt extending over said first run back toward said first lug, said second run of said belt being drawable tightly toward said first lug causing said slidable member to wedge the belt against an end of the buckle aperture closest to said first lug, wherein said buckle is releasable from said second lug by drawing the second end of said belt outwardly away from the lateral side of said tire for rotating said buckle as said belt pulls against the edge of said buckle closest to said first lug and said hook is disposed at an angle to the slot in said first lug for sliding out of said slot.

* * * * *

REEXAMINATION CERTIFICATE (184th)
United States Patent [19]
Martinelli

[11] B1 4,321,956
[45] Certificate Issued Mar. 27, 1984

[54] BELT ATTACHMENT FOR TIRE CHAINS

[75] Inventor: René J. Martinelli, Clackcamas, Oreg.

[73] Assignee: Burns Bros., Portland, Oreg.

Reexamination Request:
No. 90/000,373, May 2, 1983

Reexamination Certificate for:
Patent No.: 4,321,956
Issued: Mar. 30, 1982
Appl. No.: 122,195
Filed: Feb. 19, 1980

Related U.S. Application Data

[63] Continuation-in-part of Ser. No. 3,273, Jan. 15, 1979, Pat. No. 4,280,545.

[51] Int. Cl.$^3$ .............................................. B60C 27/00
[52] U.S. Cl. .................. 152/222; 24/68 TT; 24/71 TT; 24/129 W; 24/363; 152/221; 152/242; 403/407
[58] Field of Search ............... 152/213 A, 217, 219, 152/221-222, 233, 241-242, 170-172

[56] References Cited

U.S. PATENT DOCUMENTS

| | | | |
|---|---|---|---|
| 870,657 | 11/1907 | Woodworth | 152/222 |
| 1,063,721 | 6/1913 | Nelson | 152/222 |
| 1,185,084 | 5/1916 | Gahan | 152/221 |
| 1,341,924 | 6/1920 | Nelson | 152/222 |
| 1,424,347 | 8/1922 | Evans | 152/242 |
| 1,859,271 | 5/1932 | Reiter | 24/216 |
| 2,012,404 | 8/1935 | Reyburn | 152/14 |
| 2,469,235 | 5/1949 | Lindenthaler | 152/242 |
| 2,826,232 | 3/1958 | Korn | 152/217 |
| 3,085,614 | 4/1963 | Rozanski | 152/229 |
| 3,752,204 | 8/1973 | Ouellette | 152/219 |
| 3,796,461 | 3/1974 | Cocheran | 24/201 HE |
| 3,817,307 | 6/1974 | Detwiler | 152/226 |
| 3,898,713 | 8/1975 | Nelson et al. | 24/73 SA |
| 4,010,501 | 3/1977 | Cooke | 24/201 HE |
| 4,093,012 | 6/1978 | Detwiler | 152/226 |
| 4,155,389 | 5/1979 | Dwinell | 152/221 |
| 4,187,894 | 2/1980 | Peterson | 152/222 |
| 4,261,404 | 4/1981 | Lew | 152/221 |
| 4,263,954 | 4/1981 | Dwinell | 152/222 |

FOREIGN PATENT DOCUMENTS

| | | |
|---|---|---|
| 2908637 | 9/1979 | Fed. Rep. of Germany . |
| 352918 | 4/1961 | Switzerland . |
| 303018 | 8/1929 | United Kingdom . |
| 321123 | 10/1929 | United Kingdom . |
| 656912 | 9/1951 | United Kingdom . |

*Primary Examiner*—Lois E. Boland

[57] ABSTRACT

A wire rope traction device or cable tire chain includes lateral cables and a plurality of cross cables for extending between the lateral cables across the sole of a tire. Flat metal members secured to the lateral cables and ends of the cross cables form low profile articulated connections therebetween substantially adjacent the sole of the tire and radially outwardly from the tire sidewall flexing point for enabling a tighter grip on the tire by the tire chain. A belt attachment is employed in securing the traction device to a tire and is provided with a hook which is readily released for removal of the traction device.

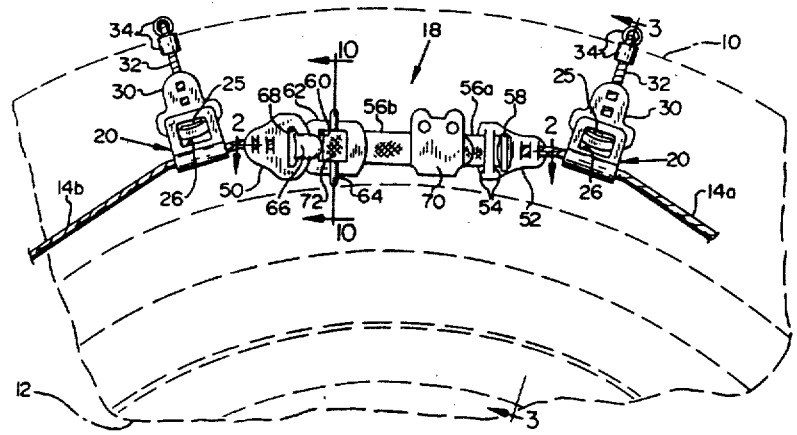

REEXAMINATION CERTIFICATE ISSUED UNDER 35 U.S.C. 307.

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 2 is confirmed.

Claim 1 is determined to be patentable as amended:

1. In a tire chain,
a tire chain lateral member adapted to extend adjacent a lateral side of a vehicle tire,
a first lug secured to a first end of said lateral member,
a second lug secured to a second end of said lateral member, said second lug having a slot,
a belt having a first end secured to said first lug,
and a buckle for location along said lateral side of said vehicle tire, said buckle having an aperture therethrough and a hook on one end thereof turned back at an acute angle [to] *outwardly away from* a laterally outwardly facing side of said buckle, wherein said hook is adapted for reception through the slot in said second lug when said tire chain is secured to said tire,
a loop of said belt between first and second ends thereof extending through the aperture of said buckle from the inwardly facing side of said buckle adjacent the lateral side of said tire, said buckle including a slidable member passing through said loop for holding said loop in releasably secured relation to said buckle when the second end of said belt is drawn up,
wherein the second end of said belt extends from said buckle toward said first end when said tire chain is secured to said tire while being movable laterally outwardly for rotating said buckle and rapidly releasing said hook from said second lug to release said tire chain from said tire.

* * * * *